United States Patent
Stoll et al.

(10) Patent No.: US 9,473,293 B2
(45) Date of Patent: Oct. 18, 2016

(54) SYSTEMS AND METHODS FOR OPERATING RADIO TRANSCEIVERS

(71) Applicant: FREESCALE SEMICONDUCTOR, INC., Austin, TX (US)

(72) Inventors: Chris N. Stoll, Dripping Springs, TX (US); Prachee S. Behera, Cedar Park, TX (US); David F. Brown, Boca Raton, FL (US); Shobak R. Kythakyapuzha, Tempe, AZ (US); Khurram Waheed, Austin, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 127 days.

(21) Appl. No.: 14/582,186

(22) Filed: Dec. 24, 2014

(65) Prior Publication Data

US 2016/0191231 A1 Jun. 30, 2016

(51) Int. Cl.
*H04B 1/40* (2015.01)
*H04L 7/033* (2006.01)

(52) U.S. Cl.
CPC .............. *H04L 7/033* (2013.01); *H04B 1/40* (2013.01)

(58) Field of Classification Search
CPC ...... H04B 1/40; H04B 1/3822; H04B 1/406; H04B 1/54; H04B 1/44

USPC ....................... 455/77, 73; 327/156
See application file for complete search history.

(56) References Cited

U.S. PATENT DOCUMENTS

| | | | |
|---|---|---|---|
| 6,215,834 B1 | 4/2001 | McCollough | |
| 6,411,143 B1 | 6/2002 | Fernandez-Texon | |
| 6,466,058 B1 | 10/2002 | Goldman | |
| 6,973,150 B1 | 12/2005 | Thuringer | |
| 8,729,937 B2 | 5/2014 | Hwang et al. | |
| 2008/0116983 A1 | 5/2008 | Kinugasa et al. | |
| 2012/0313677 A1* | 12/2012 | Thomas | H03L 7/087 327/156 |
| 2012/0319747 A1 | 12/2012 | Namdar-Mehdiabadi et al. | |
| 2015/0222278 A1* | 8/2015 | Reichelt | H03L 7/18 327/156 |

* cited by examiner

*Primary Examiner* — Nay A Maung
*Assistant Examiner* — Angelica Perez

(57) ABSTRACT

A phase lock loop monitor circuit is disclosed. The phase lock loop monitor circuit may include a coarse tuning circuit operable to generate a coarse tune failure indicator, a frequency target lock detector circuit operable to generate a frequency target failure indicator, a cycle slip monitor circuit operable to generate a cycle slip lock failure indicator, and an abort logic circuit communicatively coupled to the coarse tuning circuit, the frequency target lock detector circuit, and the cycle slip monitor circuit, the abort logic circuit operable to generate a radio operation abort indicator based at least on the coarse tune failure indicator, the frequency target failure indicator, or the cycle slip lock failure indicator.

18 Claims, 5 Drawing Sheets

SYSTEMS AND METHODS FOR OPERATING RADIO TRANSCEIVERS

BACKGROUND

1. Field

This disclosure relates generally to semiconductor integrated circuit devices, and more specifically, to semiconductor systems on a chip with one or more processing devices and a radio frequency transceiver.

2. Related Art

There is increasing demand for a low cost radio frequency (RF) transceiver integrated in a system-on-a-chip (SoC) with an embedded controller or processor and other peripherals for use in smart home, life, sensors, etc. in a market segment sometimes referred to as the internet of things (IOTs). A constant envelope RF transceiver is commonly used for low cost low data rate applications that includes a single phase locked loop (PLL) for both the receive and transmit operations. The PLL is a control system that generates a signal whose phase is related to the phase of an input signal.

To operate a PLL with a wide frequency range, a Voltage Controlled Oscillator (VCO) is first tuned to a frequency that approximates the radio carrier frequency desired (Coarse Tune), and the PLL is then engaged to lock the VCO frequency to a targeted channel frequency, which is a fractional multiple of a tightly controlled reference oscillator (Fine Tune). Regulations for transmission require that before any radio transmission is put on-air, especially in industrial, scientific and medical (ISM) radio frequency (RF) bands, radio radiated emissions be within the limits set by the Federal Communications Commission (FCC) for an allocated frequency channel.

Receive operation requires the PLL to remain locked at a desired channel frequency for an extended period of time. If the PLL frequency drifts, an incoming RF signal might not be received correctly, leading to degraded communication quality as well wasted power consumption. Correct transmit/receive operation requires the transceiver to confirm that the PLL has locked the VCO at the correct desired frequency.

Further there is a need to monitor the PLL on an on-going basis to ensure the frequency does not drift and violate the FCC rules.

The existing methods of monitoring the PLL on an on-going basis are slow and have a high rate of false alarms. Cycle slip detection requires a significant number of samples of the reference clock and the divided down PLL clock in order to determine Lock State. During this slow detection time, the transceiver may be significantly off target frequency wasting power and violating the FCC rules.

BRIEF DESCRIPTION OF THE DRAWINGS

The present disclosure is illustrated by way of example and is not limited by the accompanying figures, in which like references indicate similar elements. Elements in the figures are illustrated for simplicity and clarity and have not necessarily been drawn to scale.

DETAILED DESCRIPTION

Embodiments of systems and methods are disclosed that use three separate phase lock loop (PLL) lock measures within and after a PLL locking sequence to predict whether the PLL will reliably lock to a desired target frequency, and to check whether the PLL locks and stays locked at the desired target frequency. An initial coarse tune result is used to determine whether the PLL is within a targeted locking range. A fine-tune locked PLL frequency is measured at the end of PLL locking phase to determine whether the rest of the radio should be enabled. Once PLL is reliably locked, the quality of frequency lock is monitored at programmable times and durations while minimizing false frequency unlock alarms. If a quality lock is not achieved during start up, initialization can be aborted and power is saved at a lock check point if the PLL is expected not to lock at the desired frequency. An ongoing sequence for receive (and possibly transmit) can be aborted if the PLL loses lock to improve performance and to comply with regulations. Other components on a system on chip (SOC) can be alerted when a lock problem is detected in the PLL.

Figure 1:
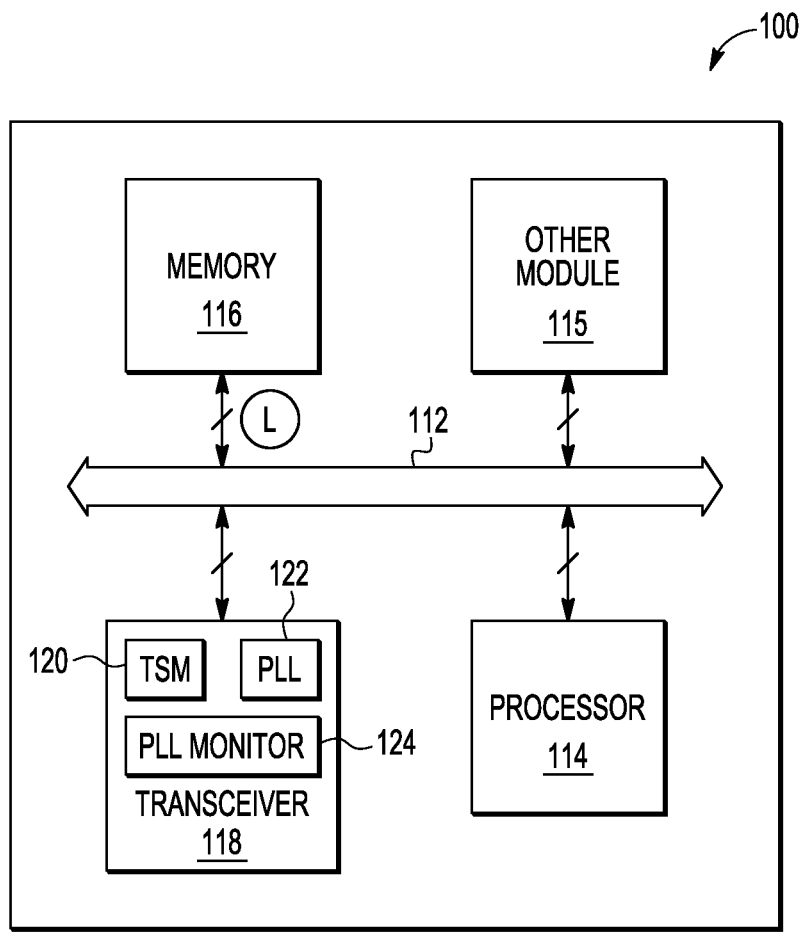
FIG. 1 is a block diagram of an embodiment of a system-on-a-chip (SOC) including a radio frequency transceiver.

FIG. 1 is a block diagram of an embodiment of an integrated circuit for a system-on-a-chip (SOC) 100 including radio frequency transceiver 118. SOC 100 includes a bus 112, a processor 114, one or more other modules 115, and a memory 116, along with radio frequency (RF) transceiver 118. Each of processor 114, module 115, memory 116, and transceiver 118 is bi-directionally coupled to bus 112. Bus 112 can be any type of bus for communicating any type of information such as data, interrupts, address, or instructions. SOC 100 has been simplified for ease of illustration. For example, there may be multiple processors like processor 114 or different from processor 114. In one embodiment, processor 114 may be any type of microprocessor (MPU), microcontroller (MCU), or digital signal processor (DSP). Also, memory 116 may be shared between the multiple processors. One or more other modules 115 may include circuits to provide specific functionally, such as for example, additional memories, a direct memory access (DMA) controller, a debug module, arbitration circuits, power management circuits, communication circuits, etc. Memory 116 may be any type of volatile or non-volatile memory, such as static random access memory (SRAM), dynamic random access memory (DRAM), flash, etc.

Transceiver 118 includes transceiver sequence manager (TSM) 120, PLL lock monitor 124, and PLL 122 and can communicate using any one or more communication protocols. For example, in one embodiment, transceiver 118 may be a RF transceiver for short range communication using the IEEE 802.15.4 communication protocol. In another embodiment, transceiver 118 may be used for a different protocol, such as Bluetooth. One embodiment of PLL 122 is illustrated in more detail below in FIG. 2.

Figure 2:
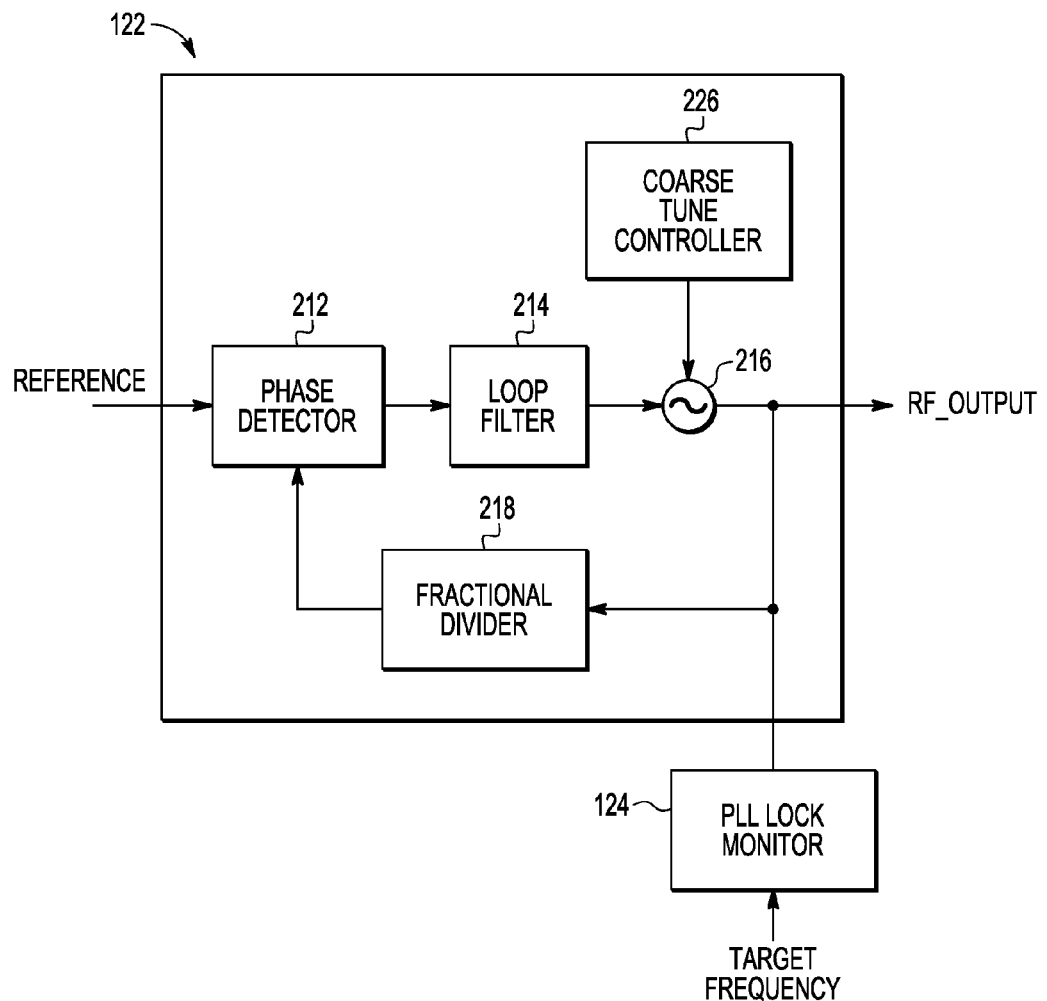
FIG. 2 is a block diagram of an embodiment of a phase locked loop (PLL) that can be used in the transceiver of FIG. 1.

FIG. 2 is a block diagram of an embodiment of PLL 122 that can be used in the SOC 100 of FIG. 1. PLL 122 includes phase detector 212, loop filter 214, voltage controlled oscillator (VCO) 216, fractional divider 218, and coarse tune controller 226. VCO 216 generates an output signal (RF_OUTPUT), whose frequency is determined by signals from course tune controller 226 and loop filter 214 applied to inputs of VCO 216. Even though a voltage controlled oscillator is shown, other types of controlled oscillators might also be used. The RF_OUTPUT signal of the VCO 216 is sampled by a fractional divider 218 placed in a feedback path of the PLL 122. The frequency of the RF_OUTPUT signal is divided down by the fractional divider 218 and the divided signal is applied to an input of a phase detector 212, where the phase is compared with the phase of a reference signal applied to another input of the phase detector 212. The reference signal may be provided by a stable reference generator, for example a crystal oscillator. It should be noted that the phase detector 212 could be designed to compare some other component of the signal such as frequency, or both frequency and phase.

Phase detector 212 produces an error signal related to the difference in the phase of the compared signals and determines whether the operational frequency of input signals needs to be increased or decreased to match the phase of these input signals. Due to noise, the VCO phase is a random process. When the VCO phase variance becomes large, a phenomenon occurs which is inherent to the nonlinearity in the loop. The VCO phase is increased to such an extent that the VCO 216 slips one or several cycles with respect to the input phase. The occurrence of a slip is an event with very low probability for weak noise, but the probability increases steeply with increasing noise power.

The output of phase detector 212 is processed by loop filter 214, which may be, for example, a passive low pass filter, by attenuating high frequency components of the output of phase detector 212. The output of phase detector 212 processed by the loop filter 214 is then applied as a control input signal to the VCO 216, to control the frequency of the VCO output signal RF_OUTPUT. In this manner the RF_OUTPUT signal is phase locked to the stable reference signal, meaning that the center frequency of the modulated signal does not change when the reference frequency remains constant. The RF_OUTPUT signal is provided to PLL lock monitor 124 and fractional divider 218.

During coarse tuning, coarse tune controller 226 can use a binary search or other suitable operation to tune VCO 216 to within a limit of a desired frequency. A frequency tuning adjustment from coarse tune controller 226 can be applied to VCO 216.

Fractional divider 218 divides the RF_OUTPUT signal by a target frequency. The divided frequency is compared with the reference frequency thereby forming a phase-locked loop. A fine analog control coming from loop filter 214 further tunes the output frequency of VCO 216.

Figure 3:
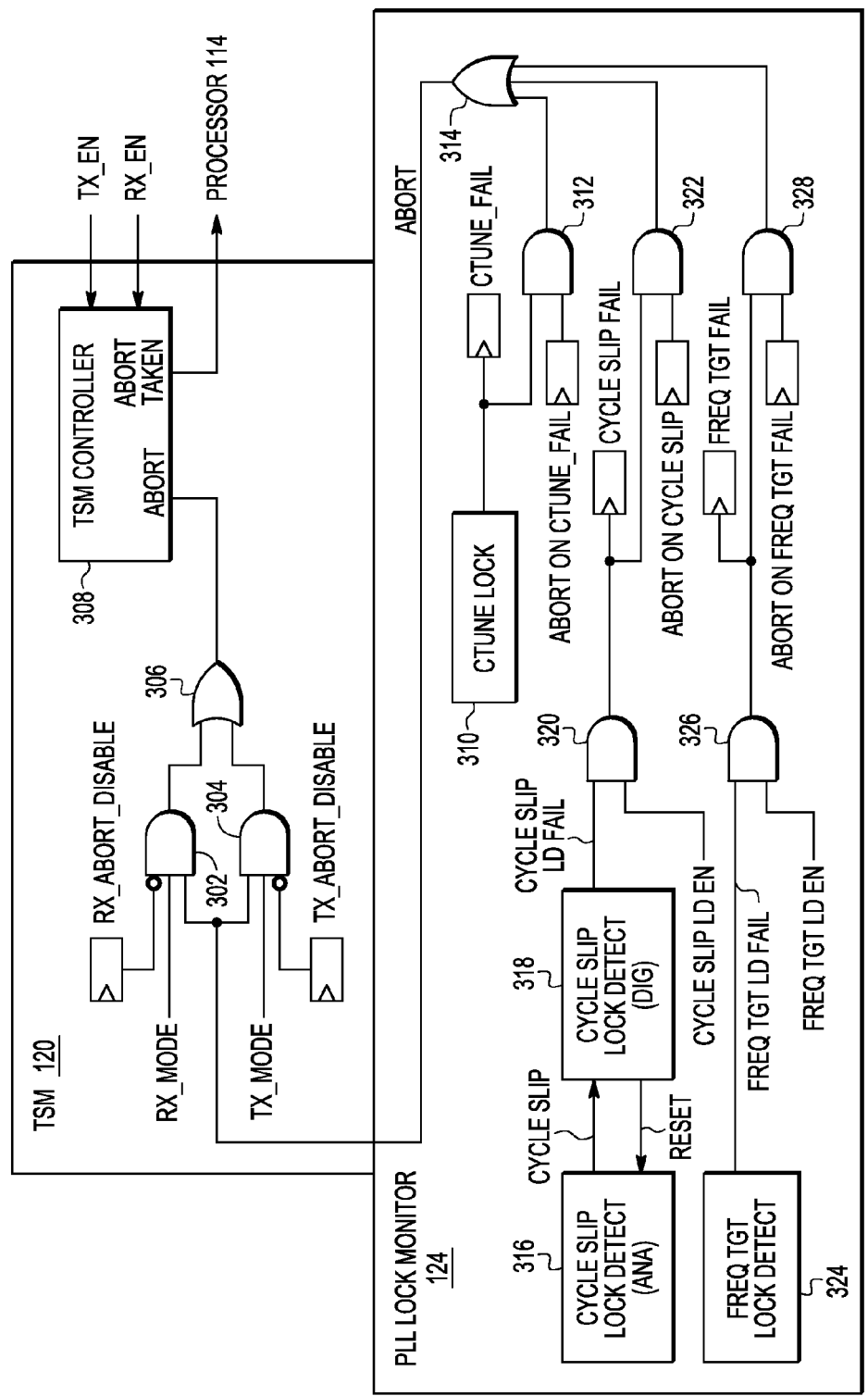
FIG. 3 is a block diagram of a PLL lock monitor and a transceiver sequence manager (TSM) that can be used in the transceiver of FIG. 1.

FIG. 3 is a block diagram of a PLL lock monitor 124 and transceiver sequence manager (TSM) 120 that can be used with the PLL of FIG. 2. TSM 120 includes AND gates 302, 304, OR gate 306, and TSM controller 308. AND gate 302 has an inverting input coupled to a receive abort disable (RX_ABORT_DISABLE) signal, a first non-inverting input coupled to an ABORT signal from PLL lock monitor 124, and a second non-inverting input coupled to a receive mode (RX_MODE) signal. An output of AND gate 302 is coupled to a first input of OR gate 306.

AND gate 304 has an inverting input coupled to a transmit abort disable (TX_ABORT_DISABLE) signal, a first non-inverting input coupled to the ABORT signal from PLL lock monitor 124, and a second non-inverting input coupled to a transmit mode (TX_MODE) signal. An output of AND gate 304 is coupled to a second input of OR gate 306.

TSM controller 308 is coupled to receive a transmit enable (TX_EN) signal and a receive enable (RX_EN) signal that is provided by a controller (not shown) in transceiver 118. An output of OR gate 306 is coupled to a first input (labeled ABORT) of TSM controller 308. An ABORT TAKEN signal is provided to processor 114 (FIG. 1) from an output of TSM controller 308.

PLL lock monitor 124 includes course tune (CTUNE) logic 310, AND gates 312, 320, 322, 326, 328, OR gate 314, analog cycle slip lock detect logic 316, digital cycle slip lock detect logic 318, and frequency target lock detect logic 324. AND gate 312 includes a first input coupled to the output of CTUNE logic 310, a second input coupled to an ABORT_ON_CTUNE_FAIL signal, and an output coupled to a first input of OR gate 314.

Analog cycle slip lock detect logic 316 provides a CYCLE_SLIP signal to digital cycle slip lock detect logic 318. A CYCLE_SLIP_LOCK_DETECT_FAIL signal output by digital cycle slip lock detect logic 318 is provided to a first input of AND gate 320. A reset signal is provided by digital cycle slip lock detect logic 318 to analog cycle slip lock detect logic 316. A CYCLE_SLIP_LOCK_DETECT_ENABLE signal is provided to a second input of AND gate 320. An output of AND gate 320, shown as a CYCLE_SLIP_FAIL signal, is coupled to a first input to AND gate 322. A second input of AND gate 322 is coupled to an ABORT_ON_CYCLE_SLIP signal, while an output of AND gate 322 is coupled to a second input of OR gate 314.

Frequency target lock detect logic 324 provides a FREQ_TGT_LOCK_DETECT_FAIL signal to a first input of AND gate 326. A FREQ_TGT_LOCK_DETECT_ENABLE signal is provided to a second input of AND gate 326. An output of AND gate 326, shown as a FREQ_TGT_FAIL signal, is coupled to a first input to AND gate 328. AND gate 328 further includes a second input coupled to an ABORT_ON_FREQ_TGT_FAIL signal, and an output coupled to a third input of OR gate 314.

The output of OR gate 314 is an ABORT signal that is provided to respective inputs of AND gates 302, 304 in TSM 120.

Figure 4:
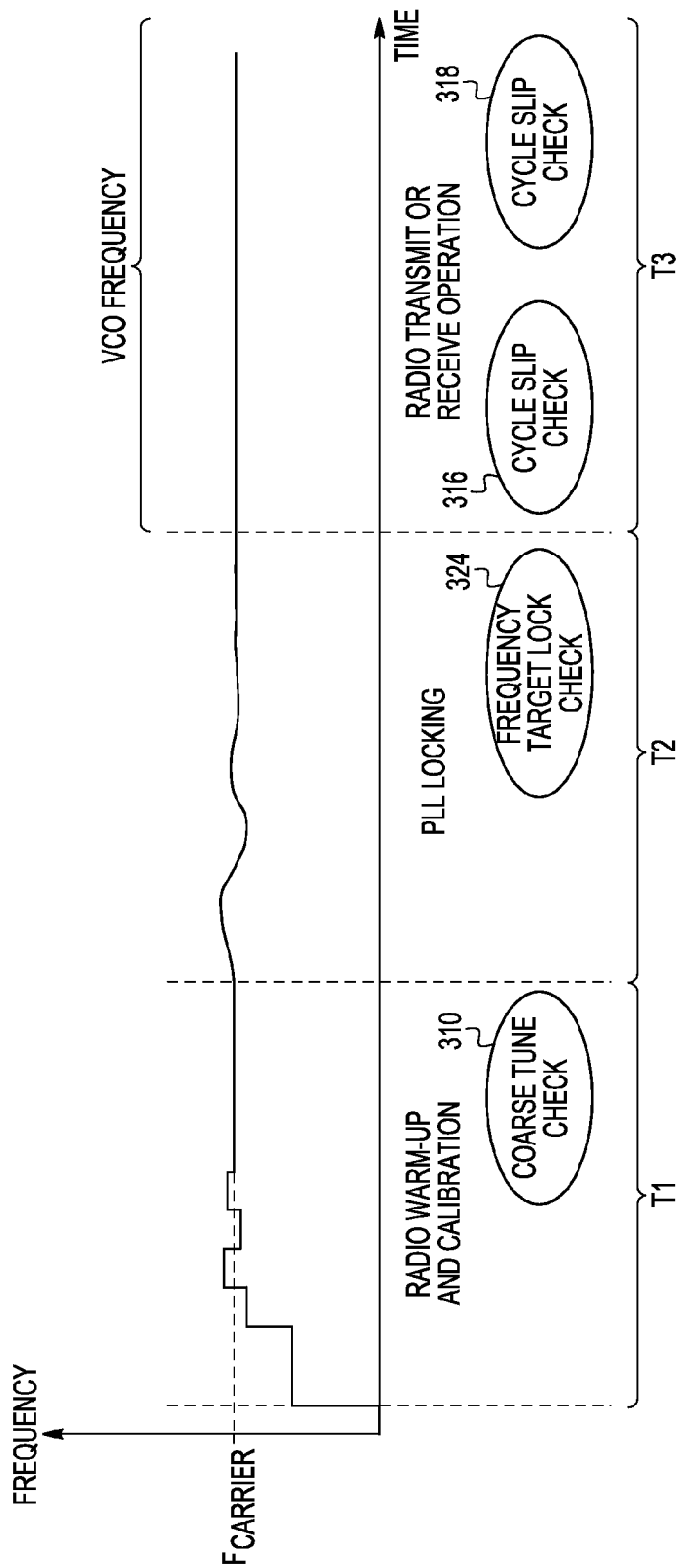
FIG. 4 is a time history diagram showing an example of three different time periods of operation of the transceiver of FIG. 1.

The operation of transceiver 118, and in particular, PLL lock monitor 124, will now be described with reference to FIGS. 3 and 4. FIG. 4 is a time history diagram showing an example of three different time periods of operation of the transceiver 118 of FIG. 1. At the beginning of a first warm-up or startup time period T1, coarse tune controller 226 initiates a coarse tuning operation. At the end of a first time period T1, coarse tune (CTUNE) logic 310 in PLL lock monitor 124 determines whether coarse tuning of PLL 122 has been achieved. If not, CTUNE logic 310 sets the CTUNE_FAIL signal to indicate that the coarse tuning process has not been successful. The CTUNE_FAIL signal can be provided by OR gate 314 as the ABORT signal to TSM 120 when the ABORT_ON_CTUNE_FAIL signal (input to AND gate 312) is also set TRUE. The ABORT signal can be used by TSM 120 and processor 114 (FIG. 1) to end the warm-up sequence of PLL 122 and reduce power consumption by powering-down transceiver 118 and/or taking other suitable action.

If the coarse tune operation is successful, transceiver 118 enters a second startup time period T2 during which PLL 122 attempts to lock on the target frequency within an allowable tolerance. At the end of the second time period T2, frequency target lock detector 324 in PLL lock monitor 124 determines whether PLL 122 has locked onto the target frequency. If not, frequency target lock detector 324 sets the FREQ_TGT_LD_FAIL signal to indicate that the target frequency lock process has not been successful. If the FREQ_TGT_LD_EN signal is also set HIGH (or TRUE), AND gate 326 sets the FREQ_TGT_FAIL signal HIGH. The FREQ_TGT_FAIL signal can be provided by OR gate 314 as the ABORT signal to TSM 120 when the ABORT_ON_FREQ_TGT_FAIL signal (input to AND gate 328) is also set TRUE. When the ABORT signal is set HIGH, TSM 120 can power-down transceiver 118 or take other suitable action, as well as notify processor 114 that the transceiver is not operational.

If the frequency lock operation is successful, transceiver 118 enters a third time period T3 during which PLL 122 enters normal operation and PLL lock monitor 124 determines whether a cycle slip is detected in analog cycle slip lock detector 316. If so, the CYCLE_SLIP signal is set to indicate that a cycle slip has occurred to digital cycle slip lock detector 318. If a threshold number of cycle slips are detected within a defined time period, digital cycle slip lock detector 318 sets the CYCLE_SLIP_LD_FAIL signal to indicate that a cycle slip occurred. Digital cycle slip lock detector 318 sends the RESET signal to analog cycle slip lock detector 316 to disable the CYCLE_SLIP signal and put the analog detector circuit in a low power state. If the CYCLE_SLIP_LD_FAIL and CYCLE_SLIP_LD_EN signals are both TRUE, the CYCLE_SLIP_FAIL signal from AND gate 320 is set. The CYCLE_SLIP_FAIL signal can be provided by OR gate 314 as the ABORT signal to TSM 120 when the ABORT_ON_CYCLE_SLIP signal (input to AND gate 322) is also set TRUE. The ABORT signal can be used by TSM 120 and processor 114 (FIG. 1) to end operation of transceiver 118 and reduce power consumption by powering-down transceiver 118 or taking other suitable action.

Figure 5:
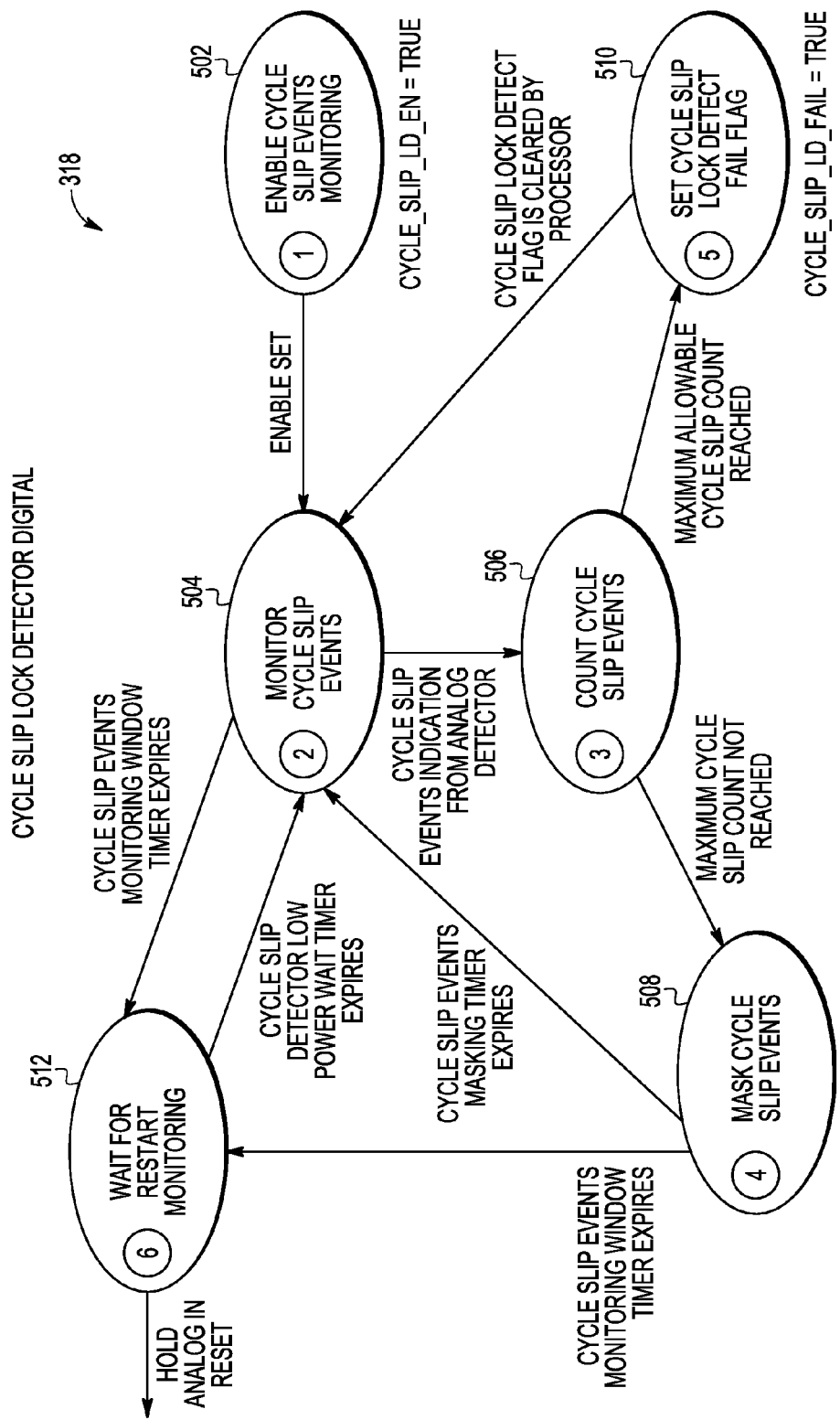
FIG. 5 is a state diagram showing examples of states and state transitions that may be implemented in cycle slip lock detect logic of FIG. 3.

Referring to FIGS. 3 and 5, FIG. 5 is a state diagram showing examples of states and state transitions that may be implemented in digital cycle slip lock detector 318 of FIG. 3. In state 502, cycle slip event monitoring is enabled by setting the CYCLE_SLIP_LD_EN signal to TRUE or HIGH. Once the CYCLE_SLIP_LD_EN signal is set TRUE, state 502 transitions to state 504 to monitor cycle slip events, as indicated by the CYCLE_SLIP signal from analog cycle slip lock detector 316. When a cycle slip is detected (e.g., CYCLE_SLIP signal is TRUE or HIGH), state 504 transitions to state 506 to add the cycle slip events to a running sum of cycle slip events. If the sum of cycle slip events is less than a maximum number of cycle slip events, state 506 transitions to state 508 to mask the number of cycle slip events, which includes ignoring any cycle slip events the analog cycle slip detector detects until one of two timers, namely a cycle slip events masking timer, which is determined by a programmed time interval between two significant cycle slip events, or a cycle slip monitoring window timer expires.

Once the cycle slip events are masked, state 508 transitions to state 512 to wait to restart monitoring if a cycle slip events monitoring window timer expires. Alternatively, state 508 transitions to state 504 to continue monitoring cycle slip events when a cycle slip events masking timer expires.

State 504 can transition to state 512 to wait to restart analog cycle slip lock detector 316 when the cycle slip events monitoring window timer expires. State 512 can transition back to state 504 when a cycle slip detector low power wait timer expires. The low power timer can be software configurable and can be implemented as a count value of reference clock cycles, for example.

Referring again to state 506, a transition from state 506 to state 510 can occur when a maximum allowable number of cycle slip counts is reached. In such a case, state 510 sets the CYCLE_SLIP_LD_FAIL signal to TRUE or HIGH. State 510 transitions to state 504 when the CYCLE_SLIP_LD_FAIL is cleared (i.e., set FALSE or LOW).

By now it should be appreciated that in some embodiments there has been provided a phase lock loop monitor circuit [124] that may include a coarse tuning circuit [310] operable to generate a coarse tune failure indicator, a frequency target lock detector circuit [324] operable to generate a frequency target failure indicator, a cycle slip monitor circuit [316, 318] operable to generate a cycle slip lock failure indicator, and an abort logic circuit [314] communicatively coupled to the coarse tuning circuit, the frequency target lock detector circuit, and the cycle slip monitor circuit, the abort logic circuit operable to generate a radio operation abort indicator based at least on the coarse tune failure indicator, the frequency target failure indicator, or the cycle slip lock failure indicator.

In another aspect, the cycle slip monitor circuit can comprise an analog cycle slip event detector circuit [316] and a digital cycle slip event detector circuit [318].

In another aspect, the cycle slip lock failure indicator can comprise an indicator that a plurality of cycle slip events have occurred within a predetermined time frame.

In another aspect, the digital cycle slip lock detector circuit can monitor cycle slips, and generate a count of cycle slip events. If the count is below a threshold, cycle slip events can be masked for a predetermined masking time. If the count is above the threshold, the cycle slip lock failure indicator can be set. A signal associated with disabling the analog cycle slip lock detector circuit can be generated when monitoring is paused.

In another aspect, the transceiver sequence manager can be further operable to generate the radio operation abort indicator based at least on the coarse tune failure indicator prior to the radio transceiver entering a phase lock loop locking phase [310].

In another aspect, the transceiver sequence manager can be further operable to generate the radio operation abort indicator based at least on the frequency target failure indicator prior to the radio transceiver entering an active radio operation [324].

In another aspect, the transceiver sequence manager further can comprise a receive mode logic circuit [302] operable to generate a first abort logic signal based at least on the radio operation abort indicator, a receive mode indicator, and a receive mode abort disable indicator, a transmit mode logic circuit [304] operable to generate a second abort logic signal based at least on the radio operation abort indicator, a transmit mode indicator, and a transmit mode abort disable indicator, and a logic circuit [306] operable to generate an abort indicator based at least on the first and second abort logic signals.

In another aspect, the transceiver sequence manager can be further operable to communicate to a processor [114] that operation of the radio has been aborted.

In another embodiment, a phase lock loop monitor circuit can comprise a coarse tuning circuit operable to generate a coarse tune failure indicator, a frequency target lock detector circuit operable to generate a frequency target failure indicator, a cycle slip monitor circuit operable to generate a cycle slip lock failure indicator, and an abort logic circuit communicatively coupled to the coarse tuning circuit, the frequency target lock detector circuit, and the cycle slip monitor circuit. The abort logic circuit is operable to generate a radio operation abort indicator based at least on the coarse tune failure indicator, the frequency target failure indicator, or the cycle slip lock failure indicator.

In another aspect, the cycle slip monitor circuit can comprise an analog cycle slip event detector circuit and a digital cycle slip event detector circuit.

In another aspect, the cycle slip lock failure indicator can comprise an indicator that a plurality of cycle slip events have occurred within a predetermined time frame.

In another aspect, the digital cycle slip lock detector circuit can be operable to monitor cycle slips, and generate a count of cycle slip events. If the count is below a threshold, cycle slip events can be masked for a predetermined masking time. If the count is above the threshold, the cycle slip lock failure indicator can be set. A signal associated with disabling the analog cycle slip lock detector circuit can be generated when monitoring is paused.

In another aspect, the abort logic circuit can be operable to communicate the radio operation abort indicator to a transceiver sequence manager. The transceiver sequence manager can be operable to generate an abort indicator based at least on the coarse tune failure indicator prior to the radio transceiver entering a phase lock loop locking phase.

In another aspect, the abort logic circuit can be operable to communicate the radio operation abort indicator to a transceiver sequence manager. The transceiver sequence manager can be operable to generate an abort indicator based at least on the frequency target failure indicator prior to the radio transceiver entering an active radio operation.

In another aspect, the transceiver sequence manager further can comprise a receive mode logic circuit operable to generate a first abort logic signal based at least on the radio operation abort indicator, a receive mode indicator, and a receive mode abort disable indicator, a transmit mode logic circuit operable to generate a second abort logic signal based at least on the radio operation abort indicator, a transmit mode indicator, and a transmit mode abort disable indicator, and a logic circuit operable to generate an abort indicator based at least on the first and second abort logic signals.

In still further embodiments, a method for monitoring cycle slips in a radio transceiver can comprise monitoring cycle slip events within a predetermined monitoring window. Upon receiving a cycle slip event indication from an analog cycle slip event detector circuit, a count of cycle slip events can be updated. If the count is below a threshold, cycle slip events can be masked for a predetermined masking time. If the count is above the threshold, a cycle slip lock failure indicator can be set. Upon expiration of the predetermined monitored window, monitoring can be suspended. Upon expiration of a predetermined low power wait time, monitoring can be resumed.

In another aspect, the method can further comprise generating a signal associated with a suspension of the analog cycle slip event detector circuit when suspending monitoring.

In another aspect, the method can further comprise clearing the cycle slip lock failure indicator and subsequently resuming monitoring.

In another aspect, the method can further comprise enabling cycle slip monitoring events.

Because the apparatus implementing the present disclosure is, for the most part, composed of electronic components and circuits known to those skilled in the art, circuit details will not be explained in any greater extent than that considered necessary as illustrated above, for the understanding and appreciation of the underlying concepts of the present disclosure and in order not to obfuscate or distract from the teachings of the present disclosure.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the disclosure described herein are, for example, capable of operation in other orientations than those illustrated or otherwise described herein.

The term "program," as used herein, is defined as a sequence of instructions designed for execution on a computer system. A program, or computer program, may include a subroutine, a function, a procedure, an object method, an object implementation, an executable application, an applet, a servlet, a source code, an object code, a shared library/dynamic load library and/or other sequence of instructions designed for execution on a computer system.

Some of the above embodiments, as applicable, may be implemented using a variety of different information processing systems. For example, although FIG. 1 and the discussion thereof describe an exemplary information processing architecture, this exemplary architecture is presented merely to provide a useful reference in discussing various aspects of the disclosure. Of course, the description of the architecture has been simplified for purposes of discussion, and it is just one of many different types of appropriate architectures that may be used in accordance with the disclosure. Those skilled in the art will recognize that the boundaries between logic blocks are merely illustrative and that alternative embodiments may merge logic blocks or circuit elements or impose an alternate decomposition of functionality upon various logic blocks or circuit elements.

Thus, it is to be understood that the architectures depicted herein are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Also for example, in one embodiment, the illustrated elements of system 100 are circuitry located on a single integrated circuit or within a same device. Alternatively, system 100 may include any number of separate integrated circuits or separate devices interconnected with each other.

Furthermore, those skilled in the art will recognize that boundaries between the functionality of the above described operations merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

In one embodiment, system 100 is a computer system such as a personal computer system. Other embodiments may include different types of computer systems. Computer systems are information handling systems which can be designed to give independent computing power to one or more users. Computer systems may be found in many forms including but not limited to mainframes, minicomputers, servers, workstations, personal computers, notepads, personal digital assistants, electronic games, automotive and other embedded systems, cell phones and various other wireless devices. A typical computer system includes at least one processing unit, associated memory and a number of input/output (I/O) devices.

A computer system processes information according to a program and produces resultant output information via I/O devices. A program is a list of instructions such as a particular application program and/or an operating system. A computer program is typically stored internally on computer readable storage medium or transmitted to the computer system via a computer readable transmission medium. A computer process typically includes an executing (running) program or portion of a program, current program values and state information, and the resources used by the operating system to manage the execution of the process. A parent process may spawn other, child processes to help perform the overall functionality of the parent process. Because the parent process specifically spawns the child processes to perform a portion of the overall functionality of the parent process, the functions performed by child processes (and grandchild processes, etc.) may sometimes be described as being performed by the parent process.

Although the disclosure is described herein with reference to specific embodiments, various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure. Any benefits, advantages, or solutions to problems that are described herein with regard to specific embodiments are not intended to be construed as a critical, required, or essential feature or element of any or all the claims.

The term "coupled," as used herein, is not intended to be limited to a direct coupling or a mechanical coupling.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to disclosures containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A radio transceiver comprising:
    a coarse tuning circuit operable to generate a coarse tune failure indicator;
    a frequency target lock detector circuit operable to generate a frequency target failure indicator;
    a cycle slip monitor circuit operable to generate a cycle slip lock failure indicator; and
    a transceiver sequence manager communicatively coupled to the coarse tuning circuit, the frequency target lock detector circuit, and the cycle slip monitor circuit, the transceiver sequence manager operable to generate a radio operation abort indicator based at least on the coarse tune failure indicator, the frequency target failure indicator, or the cycle slip lock failure indicator;
    a receive mode logic circuit operable to generate a first abort logic signal based at least on the radio operation abort indicator, a receive mode indicator, and a receive mode abort disable indicator;
    a transmit mode logic circuit operable to generate a second abort logic signal based at least on the radio operation abort indicator, a transmit mode indicator, and a transmit mode abort disable indicator; and
    a logic circuit operable to generate an abort indicator based at least on the first and second abort logic signals.

2. The radio transceiver of claim 1, wherein the cycle slip monitor circuit comprises an analog cycle slip event detector circuit and a digital cycle slip event detector circuit.

3. The radio transceiver of claim 2, wherein the digital cycle slip lock detector circuit is operable to:
    monitor cycle slips;
    generate a count of cycle slip events;
    if the count is below a threshold, mask cycle slip events for a predetermined masking time;
    if the count is above the threshold, set the cycle slip lock failure indicator; and
    generate a signal associated with disabling the analog cycle slip lock detector circuit when monitoring is paused.

4. The radio transceiver of claim 1, wherein the cycle slip lock failure indicator comprises an indicator that a plurality of cycle slip events have occurred within a predetermined time frame.

5. The radio transceiver of claim 1, wherein the transceiver sequence manager is further operable to generate the radio operation abort indicator based at least on the coarse tune failure indicator prior to the radio transceiver entering a phase lock loop locking phase.

6. The radio transceiver of claim 1, wherein the transceiver sequence manager is further operable to generate the radio operation abort indicator based at least on the frequency target failure indicator prior to the radio transceiver entering an active radio operation.

7. The radio transceiver of claim 1, wherein the transceiver sequence manager is further operable to communicate to a processor that operation of the radio has been aborted.

8. A phase lock loop monitor circuit comprising:
    a coarse tuning circuit operable to generate a coarse tune failure indicator;
    a frequency target lock detector circuit operable to generate a frequency target failure indicator;
    a cycle slip monitor circuit operable to generate a cycle slip lock failure indicator; and
    an abort logic circuit communicatively coupled to the coarse tuning circuit, the frequency target lock detector circuit, and the cycle slip monitor circuit, the abort logic circuit operable to generate a radio operation abort indicator based at least on the coarse tune failure indicator, the frequency target failure indicator, or the cycle slip lock failure indicator;
    a receive mode logic circuit operable to generate a first abort logic signal based at least on the radio operation abort indicator, a receive mode indicator, and a receive mode abort disable indicator;
    a transmit mode logic circuit operable to generate a second abort logic signal based at least on the radio operation abort indicator, a transmit mode indicator, and a transmit mode abort disable indicator; and
    a logic circuit [306] operable to generate an abort indicator based at least on the first and second abort logic signals.

9. The phase lock loop monitor circuit of claim 8, wherein the cycle slip monitor circuit comprises an analog cycle slip event detector circuit and a digital cycle slip event detector circuit.

10. The phase lock loop monitor circuit of claim 9, wherein the digital cycle slip lock detector circuit is operable to:
monitor cycle slips;
generate a count of cycle slip events;
if the count is below a threshold, mask cycle slip events for a predetermined masking time;
if the count is above the threshold, set the cycle slip lock failure indicator; and
generate a signal associated with disabling the analog cycle slip lock detector circuit when monitoring is paused.

11. The phase lock loop monitor circuit of claim 8, wherein the cycle slip lock failure indicator comprises an indicator that a plurality of cycle slip events have occurred within a predetermined time frame.

12. The phase lock loop monitor circuit of claim 8, wherein the abort logic circuit is operable to communicate the radio operation abort indicator to a transceiver sequence manager, wherein the transceiver sequence manager is operable to generate an abort indicator based at least on the coarse tune failure indicator prior to the radio transceiver entering a phase lock loop locking phase.

13. The phase lock loop monitor circuit of claim 8, wherein the abort logic circuit is operable to communicate the radio operation abort indicator to a transceiver sequence manager, wherein the transceiver sequence manager is operable to generate an abort indicator based at least on the frequency target failure indicator prior to the radio transceiver entering an active radio operation.

14. The phase lock loop monitor circuit of claim 13, wherein the transceiver sequence manager further comprises:
a receive mode logic circuit operable to generate a first abort logic signal based at least on the radio operation abort indicator, a receive mode indicator, and a receive mode abort disable indicator;
a transmit mode logic circuit operable to generate a second abort logic signal based at least on the radio operation abort indicator, a transmit mode indicator, and a transmit mode abort disable indicator; and
a logic circuit operable to generate an abort indicator based at least on the first and second abort logic signals.

15. A method for monitoring cycle slips in a radio transceiver, the method comprising:
monitoring cycle slip events within a predetermined monitoring window;
upon receiving a cycle slip event indication from an analog cycle slip event detector circuit, updating a count of cycle slip events;
if the count is below a threshold, masking cycle slip events for a predetermined masking time;
if the count is above the threshold, setting a cycle slip lock failure indicator;
upon expiration of the predetermined monitored window, suspending monitoring;
upon expiration of a predetermined low power wait time, resuming monitoring;
generating a first abort logic signal based at least on the radio operation abort indicator, a receive mode indicator, and a receive mode abort disable indicator;
generating a second abort logic signal based at least on the radio operation abort indicator, a transmit mode indicator, and a transmit mode abort disable indicator; and
generating an abort indicator based at least on the first and second abort logic signals.

16. The method of claim 15, further comprising generating a signal associated with a suspension of the analog cycle slip event detector circuit when suspending monitoring.

17. The method of claim 15, further comprising clearing the cycle slip lock failure indicator and subsequently resuming monitoring.

18. The method of claim 15, further comprising enabling cycle slip monitoring events.

* * * * *